(12) United States Patent
Sumi et al.

(10) Patent No.: US 7,919,557 B2
(45) Date of Patent: Apr. 5, 2011

(54) AQUEOUS COATING COMPOSITION, PROCESS FOR PRODUCING IT AND TWO-PACK TYPE CURABLE AQUEOUS COATING KIT

(75) Inventors: Naoko Sumi, Chiyoda-ku (JP); Takashi Morizumi, Chiyoda-ku (JP); Isao Kimura, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 12/731,208

(22) Filed: Mar. 25, 2010

(65) Prior Publication Data

US 2010/0190917 A1    Jul. 29, 2010

Related U.S. Application Data

(60) Division of application No. 12/408,133, filed on Mar. 20, 2009, which is a continuation of application No. PCT/JP2007/068431, filed on Sep. 21, 2007.

(30) Foreign Application Priority Data

Sep. 22, 2006 (JP) ................................ 2006-257053

(51) Int. Cl.
*C08L 27/12* (2006.01)
(52) U.S. Cl. ......... 524/544; 524/545; 524/546; 524/556
(58) Field of Classification Search ........... 524/544–546
See application file for complete search history.

(56) References Cited

U.S. PATENT DOCUMENTS

| | | | |
|---|---|---|---|
| 5,010,121 A * | 4/1991 | Yeates et al. ................. | 523/336 |
| 5,171,804 A | 12/1992 | Tomihashi et al. | |
| 5,258,447 A | 11/1993 | Koishi et al. | |
| 5,447,982 A | 9/1995 | Kamba et al. | |
| 5,856,394 A * | 1/1999 | Hirashima et al. ............ | 524/545 |
| 2009/0048391 A1 | 2/2009 | Sumi et al. | |
| 2010/0120971 A1 | 5/2010 | Sumi et al. | |

FOREIGN PATENT DOCUMENTS

| EP | 1 593 720 A1 | 11/2005 |
|---|---|---|
| JP | 01-029488 | 6/1989 |
| JP | 04-226111 | 8/1992 |
| JP | 08-151551 | 6/1996 |
| JP | 08-193178 | 7/1996 |
| JP | 08-283616 | 10/1996 |
| JP | 08-302282 | 11/1996 |
| JP | 08-319450 | 12/1996 |
| JP | 10-101985 | 4/1998 |
| JP | 2005-248157 | 9/2005 |
| WO | 2007-072826 | 6/2007 |
| WO | 2008-018518 | 2/2008 |
| WO | 2008-041766 | 4/2008 |
| WO | 2008-047761 | 4/2008 |

* cited by examiner

*Primary Examiner* — Mark Eashoo
*Assistant Examiner* — Nicole M Buie-Hatcher
(74) *Attorney, Agent, or Firm* — Oblon, Spivak, McClelland, Maier & Neustadt, L.L.P.

(57) ABSTRACT

An aqueous coating composition which has a low content of an organic solvent, whereby a burden on an environment is small; in which an increase of the molecular weight, gelation, etc. are suppressed; which performs excellent storage stability and provides a coating film having good water permeability/water which composition is obtained by dispersing a fluorocopolymer (A) obtained by solution polymerization in an aqueous medium, and which comprises a repeating unit (1) of fluoroolefin, a repeating unit (2) of a vinyl or allyl monomer, a repeating unit (3) of a vinyl or allyl monomer having a hydroxyl group bonded thereto, and a unit (4) of a vinyl or allyl monomer having a carboxylate group bonded thereto, and which comprises a fluorocopolymer (A) wherein a proportion of the repeating unit (4) is from 0.4 mol % to less than 4 mol % based on the total repeating units, and an aqueous medium, wherein an amount of an organic solvent contained in the composition is from 0 to 1 mass %.

15 Claims, No Drawings

AQUEOUS COATING COMPOSITION, PROCESS FOR PRODUCING IT AND TWO-PACK TYPE CURABLE AQUEOUS COATING KIT

This is a divisional application of U.S. application Ser. No. 12/408,133, filed Mar. 20, 2009, which is a 371 of PCT/JP07/68431 filed on Sep. 21, 2007.

TECHNICAL FIELD

The present invention relates to an aqueous coating composition containing a fluorocopolymer containing a carboxylate group, a process for producing it, and a two-pack type curable aqueous coating kit using the aqueous coating composition.

BACKGROUND ART

An aqueous coating material is useful as a coating material suitable for natural environmental protection since it is possible to reduce the content of an organic solvent as compared with a solvent type coating material. As a process for producing the aqueous coating material, a process to obtain a water-dispersion by emulsion polymerization of a fluorocopolymer, is known. However, in order to secure the dispersion stability only by an emulsifier, a substantial amount of the emulsifier needs to be used, which causes decrease of the water resistance or weather resistance of a coating film to be obtained. As one of the methods to solve such a problem, it has been proposed to introduce hydrophilic moieties in a copolymer.

For example, Patent Document 1 discloses an invention relating to an aqueous coating composition. It is disclosed that the composition can be obtained by carrying out emulsion polymerization of a fluoroolefin with another monomer by using a fluorocopolymer having a hydrophilic side chain as an emulsifier.

Patent Document 2 discloses an invention of a coating material which is a composition comprising a polymer for fluorinated coating material which contains from 4 to 30 mol % of a carboxylate-containing structure unit in which at least 30% of a carboxyl group is neutralized with ammonia or a tertiary amine, and an aqueous medium containing at least 10 vol % of a hydrophilic medium based on water.

Patent Document 2: U.S. Pat. No. 5,447,982
Patent Document 3: U.S. Pat. No. 5,171,804

DISCLOSURE OF THE INVENTION

Problems to be Solved by the Invention

Patent Document 1 discloses that the amount of hydrophilic moieties gives an influence on emulsion polymerization, but it does not disclose an influence given by a carboxylate group and its amount on an aqueous coating composition at all.

With respect to the polymer for a fluorinated coating material described in Patent Document 2, problems were confirmed such that the molecular weight of the polymer increased by preservation, whereby gelation was caused, the dispersion stability decreased, etc. Further, there was also a problem such that as a result of applying a coating composition prepared by reducing the amount of an organic solvent in the polymer, the storage stability and the water permeability/water resistance were insufficient.

Under the above circumstances, the present invention has objects to provide a composition wherein increase of the molecular weight, gelation, agglomeration, etc. are suppressed, and an excellent storage stability is performed; and a composition which forms a coating film having good water permeability/water resistance.

That is, the present invention provides an aqueous coating composition which comprises a fluorocopolymer containing a carboxylate group in a specific amount and an aqueous medium, and which exhibits the above performance; a process for producing the aqueous coating composition; and a two-pack type curable aqueous coating material kit.

Means to Solve the Problems

The present inventors have found that a composition comprising a fluorocopolymer containing a carboxylic group in a specific amount becomes a composition wherein increase of the molecular weight, gelation, agglomeration, etc. are suppressed, and an excellent storage stability is performed; and they have found that such performances are obtainable even when no organic solvent is substantially present. Further, they have found that the aqueous coating composition of the present invention forms a coating film having good water permeability/water to resistance.

The present invention provides the following.
(1) An aqueous coating composition which is a composition obtained by dispersing a fluorocopolymer (A) obtained by a solution polymerization method, in an aqueous medium, and which comprises the fluorocopolymer (A) which is a copolymer containing the following units (1) to (4), wherein a proportion of the repeating unit (4) is from 0.4 mol % to less than 4 molt based on the total repeating units, and an aqueous medium, wherein an amount of an organic solvent contained in the composition is from 0 to 1 mass %:
Unit (1): a repeating unit of a fluoroolefin
Unit (2): a repeating unit of a vinyl monomer or an allyl monomer, and a hydroxyl group and/or a carboxyl group which may form a salt, is not bonded to the unit
Unit (3): a repeating unit of a vinyl monomer having a hydroxyl group bonded thereto or of an allyl monomer having a hydroxyl group bonded thereto, and a carboxyl group which may form a salt, is not bonded to the unit
Unit (4): a repeating unit of a vinyl monomer or an allyl monomer, which is also a repeating unit to which a carboxylate group in which a part may be a carboxyl group, is bonded.
(2) The aqueous coating composition according to (1), wherein the unit (1) is a unit represented by the following formula (a1), the unit (2) is a unit represented by the following formula (a2), the unit (3) is a unit represented by the following formula (a3), and the unit (4) is a unit represented by the following formula (a4-1):

$$—CFX^1—CX^2X^3— \tag{a1}$$

(in the formula (a1), each of $X^1$ and $X^2$ is independently a hydrogen atom, a chlorine atom or a fluorine atom, $X^3$ is a chlorine atom, a fluorine atom or $—CY^1Y^2Y^3$ (wherein each of $Y^1$, $Y^2$ and $Y^3$ is independently a hydrogen atom, a chlorine atom or a fluorine atom);

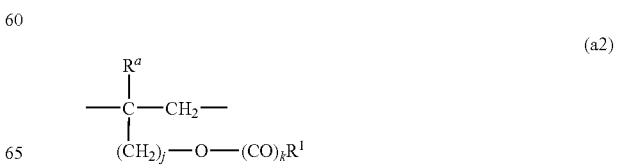

(in the formula (a2), $R^a$ is a hydrogen atom or a methyl group, $R^1$ is a $C_{1-12}$ alkyl group or a $C_{4-10}$ monovalent alicyclic hydrocarbon group, j is 0 or 1, and k is 0 or 1);

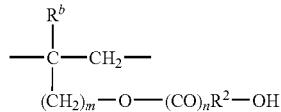
(a3)

(in the formula (a3), $R^b$ is a hydrogen atom or a methyl group, $R^2$ is a $C_{1-10}$ alkylene group or a $C_{4-10}$ divalent alicyclic hydrocarbon group, m is 0 or 1, and n is 0 or 1);

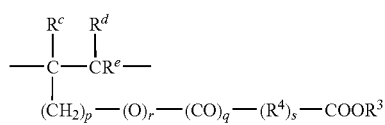
(a4-1)

(in the formula (a4-1), $R^c$ is a hydrogen atom or a methyl group, $R^d$ is a hydrogen atom or a methyl group, —COOR$^3$ is a carboxylate group in which a part may be a carboxyl group, $R^e$ is a hydrogen atom or —COOR$^3$ (—COOR$^3$ has the same meaning as above), p is 0 or 1, r is 0 or 1, q is 0 or 1, $R^4$ is a $C_{1-15}$ alkylene group or a $C_{4-10}$ divalent alicyclic hydrocarbon group, and s is 0 or 1).

(3) The aqueous coating composition according to (1) or (2), wherein the fluorocopolymer (A) contains from 40 to 60 mol % of the unit (1), from 3 to 50 mol % of the unit (2), from 4 to 30 mol % of the unit (3), from 0.4 to less than 4 mol % of the unit (4), and from 0 to 20 mol %; of a unit (5) other than the units (1), (2), (3) and (4).

(4) The aqueous coating composition according to any one of (1) to (3), wherein the fluorocopolymer (A) contains from 1.4 to 3.9 mol % of the unit (4).

(5) The aqueous coating composition according to any one of (1) to (4), wherein the proportion of the carboxylate group is at least 60 mol % based on the total amount of the carboxyl group and the carboxylate group which are present in the fluorocopolymer (A).

(6) The aqueous coating composition according to any one of (1) to (5), wherein the carboxylate group is a quaternary ammonium salt group of a carboxyl group.

(7) The aqueous coating composition according to any one of (1) to (6), wherein the aqueous medium comprises only water, or water and an organic solvent, and the amount of the organic solvent is from 0 to 0.5 mass % in the composition.

(8) The aqueous coating composition according to any one of (1) to (7), wherein a part or whole of the fluorocopolymer (A) is dispersed in the composition.

(9) A process for producing the aqueous coating composition as defined in any one of (1) to (4), which is characterized by carrying out sequentially a step of a copolymerization reaction in an organic solvent to obtain a fluorocopolymer (B) containing the unit (1), the unit (2), the unit (3) and a polymerized unit (4-3) derived from a monomer having a carboxyl group bonded thereto, and a step of neutralizing a part or whole of the carboxyl group in the fluorocopolymer (B) by adding a basic compound; a step of adding water; and a step of removing the organic solvent.

(10) The process for producing the aqueous coating composition according to (9), wherein the unit (1) is a unit represented by the formula (a1), the unit (2) is a unit represented by the formula (a2), the unit (3) is a unit represented by the formula (a3), and the unit (4-3) is a unit represented by the following formula (a4-3):

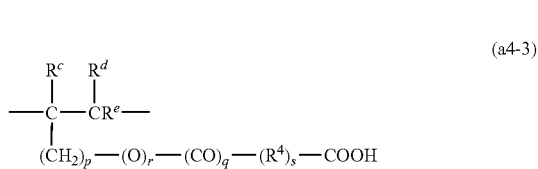
(a4-3)

(in the formula (a4-3), $R^c$ is a hydrogen atom or a methyl group, $R^d$ is a hydrogen atom or a methyl group, $R^e$ is a hydrogen atom or —COOH, p is 0 or 1, r is 0 or 1, q is 0 or 1, $R^4$ is a $C_{1-15}$ alkylene group or a $C_{4-10}$ divalent alicyclic hydrocarbon group, and s is 0 or 1).

(11) The process for producing the aqueous coating composition according to (9) or (10), wherein the fluorocopolymer (B) contains from 40 to 60 mol t of the unit (1), from 3 to 50 mol % of the unit (2), from 4 to 30 mol % of the unit (3), from 0.4 to less than 4 mol t of the unit (4-3), and from 0 to 20 mol t of the unit (5) other than the units (1), (2), (3) and (4-3).

(12) The process for producing the aqueous coating composition according to (9), (10) or (11), wherein the step for neutralization with the basic compound and the step of adding water, are carried out as a step of adding the basic compound as an aqueous solution, or a step for neutralization with the basic compound is carried out as a step for neutralization by using an aqueous solution of the basic compound.

(13) A two-pack type curable aqueous coating material kit comprising the aqueous coating composition according to any one of (1) to (8), and a water-soluble or water-dispersible curing agent having a functional group reactive with a hydroxyl group or a carboxyl group, independently.

Effects of the Invention

With respect to the aqueous coating composition of the present invention, the content of an organic solvent low, whereby a burden on an environment is small, and even if the content of the organic solvent is reduced, increase of the molecular weight of a polymer or gelation is suppressed, whereby the dispersion stability is good, and the storage stability is excellent. Further, the aqueous coating composition of the present invention provides a coating film having good water permeability/water resistance.

Further, the aqueous coating composition of the present invention provides a two-pack type curable aqueous coating material kit which exhibits the above performances and is easy to be handled.

BEST MODE FOR CARRYING OUT THE INVENTION

Aqueous Coating Composition
Fluorocopolymer (A)

In the present specification, constituent repeating units constituting the polymer are abbreviated as "unit". The units in the present invention may be a repeating unit (a polymerized unit) which can directly be obtained by polymerizing a monomer, or a unit which can be obtained by chemically converting the repeating unit.

Further, a unit represented by a formula (a1) is also shown as "a unit (a1)". The same applies to compounds represented by other formulae. A monomer represented by the following formula (b1) is also shown as "a monomer (b1)".

The aqueous coating composition (hereinafter sometimes referred to as "a composition") of the present invention contains a fluorocopolymer (A) as an essential component. The fluorocopolymer (A) is preferably contained in such a state that a part or whole of it is dispersed in the composition. When a part of the fluorocopolymer (A) is dispersed therein, the rest is preferably contained in a dissolved state.

The fluorocopolymer (A) contains the following units (1) to (4), as essential units:

Unit (1): A repeating unit of a fluoroolefin.

Unit (2): A repeating unit of a vinyl monomer or an allyl monomer, and a hydroxyl group and/or a carboxyl group which may form a salt, is not bonded to the unit.

Unit (3): A repeating unit of a vinyl monomer having a hydroxyl group bonded thereto or of an allyl monomer having a hydroxyl group bonded thereto, and a carboxyl group which may form a salt, is not bonded to the unit.

Unit (4): A repeating unit of a vinyl monomer or an allyl monomer, which is also a repeating unit to which a carboxylate group in which a part may be a carboxyl group, is bonded.

An example for each unit may be a known unit in the fluorocopolymer to be contained in a coating composition. Each vinyl monomer in the units (2) to (4) is preferably a vinyl ether monomer, and the allyl monomer is preferably an allyl ether monomer.

The fluorocopolymer (A) may be a copolymer containing only the units (1) to (4) or a copolymer containing also a unit other than the units (1) to (4) (shown as a unit (5)).

The fluorocopolymer (A) is preferably a copolymer comprising from 40 to 60 molt of the unit (1), from 3 to 50 mol % of the unit (2), from 4 to 30 mol % of the unit (3), from 0.4 to less than 4 mol % of the unit (4), and from 0 to 20 mol % of the unit (5) other than the units (1), (2), (3) and (4). The mol % is a proportion based on the total units of the fluorocopolymer (A), and the sum of the mol % of the respective units is 100 mo %.

The unit (1) is preferably a unit represented by a formula (a1), the unit (2) is preferably a unit represented by a formula (a2), the unit (3) is preferably a unit represented by a formula (a3), and the unit (4) is preferably a unit represented by a formula (a4-1).

The unit (a1) is represented by the following formula (a1):

$$—CFX^1—CX^2X^3—  \quad (a1)$$

(In the formula (a1), each of $X^1$ and $X^2$ is independently a hydrogen atom, a chlorine atom or a fluorine atom, $X^3$ is a chlorine atom, a fluorine atom or $—CY^1Y^2Y^3$ (wherein each of $Y^1$, $Y^2$ and $Y^3$ is independently a hydrogen atom, a chlorine atom or a fluorine atom.)

As the unit (a1), a unit obtained by polymerizing the following monomer may, for example, be mentioned. A fluoroethylene such as $CF_2=CF_2$, $CClF=CF_2$, $CHCl=CF_2$, $CCl_2=CF_2$, $CClF=CClF$, $CHF=CCl_2$, $CH_2=CClF$, $CCl_2=CClF$ or $CH_2=CF_2$; or a fluoropropene such as $CF_2ClCF=CF_2$, $CF_3CCl=CF_2$, $CF_3CF=CFCl$, $CF_2ClCCl=CF_2$, $CF_2ClCF=CFCl$, $CFCl_2CF=CF_2$, $CF_3CCl=CClF$, $CF_3CCl=CCl_2$, $CClF_2CF=CCl_2$, $CCl_3CF=CF_2$, $CF_2ClCCl=CCl_2$, $CFCl_2CCl=CCl_2$, $CF_3CF=CHCl$, $CClF_2CF=CHCl$, $CH_3CCl=CHCl$, $CHF_2CCl=CCl_2$, $CF_2CCl=CCl_2$, $CF_2ClCCl=CHCl$, $CCl_3CF=CHCl$ or $CF_3CF=CF_2$.

Among them, $CF_2=CF_2$ or $CClF=CF_2$ is preferred since the weather resistance of a coating film is excellent.

When the proportion of the unit (1) is in the above range, it is possible to obtain a good coating film for such a reason that the sufficient weather resistance is obtained, the glass transition temperature of a polymer does not become too high, or no crystallinity appears.

The proportion of the unit (1) is particularly preferably from 45 to 55 mol %.

The unit (a2) is represented by the following formula (a2). The unit is a unit obtained by polymerizing an alkyl vinyl ether and/or alkyl vinyl ester, an alkyl allyl ether, or an alkyl allyl ester:

(In the formula (a2), $R^a$ is a hydrogen atom or a methyl group, $R^1$ is a $C_{1-12}$ alkyl group or a $C_{4-10}$ monovalent alicyclic hydrocarbon group, j is 0 or 1, and k is 0 or 1.)

The unit (a2) may be a unit obtained by polymerizing ethyl vinyl ether, n-butyl vinyl ether, cyclohexyl vinyl ether, vinyl acetate, vinyl valerate, vinyl pivalate, etc., and among them, a unit suitable for desired physical properties (hardness, gloss, pigment-dispersibility, etc.) of a coating film, is optionally selected.

Among them, ethyl vinyl ether, cyclohexyl vinyl ether, etc. are preferred since they have good alternating copolymerizability with a monomer for forming the unit (a1), and it is thereby easy to adjust the glass transition temperature of a resin. The proportion of the unit (2) is particularly preferably from 20 to 40 mol %.

The unit (a3) is represented by the following formula (a3). The unit is a unit obtained by polymerizing a hydroxyl group-containing vinyl ether, a hydroxyl group-containing vinyl ester, a hydroxyl group-containing allyl ether or a hydroxyl group-containing allyl ester:

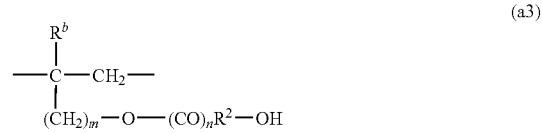

(In the formula (a3), $R^b$ is a hydrogen atom or a methyl group, $R^2$ is a $C_{1-10}$ alkylene group or a $C_{4-10}$ divalent alicyclic hydrocarbon group, m is 0 or 1, and n is 0 or 1.

The unit (a3) is preferably a unit obtained by polymerizing a 2-hydroxyalkyl vinyl ether, 4-hydroxybutyl vinyl ether, 1-hydroxymethyl-4-vinyloxymethyl cyclohexane or 4-hydroxybutyl vinyl ester, and a hydroxyalkyl vinyl ether is particularly preferred from the viewpoint of the polymerization property, the crosslinking property, etc.

The proportion of the unit (a3) is preferably from 4 to 30 mol %, particularly preferably from 8 to 25 mol %. When the proportion of the unit (a3) is in such a range, there is an advantage such that the crosslink density can be increased, or the water resistance can be improved.

The unit (a4-1) is represented by the following formula (a4-1):

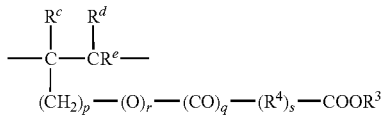

(In the formula (a4-1), $R^c$ is a hydrogen atom or a methyl group, $R^d$ is a hydrogen atom or a methyl group, —COOR³ is a carboxylate group in which a part may be a carboxyl group, $R^3$ is a hydrogen atom or —COOR³ ($R^3$ has the same meaning as above), p is 0 or 1, r is 0 or 1, q is 0 or 1, $R^4$ is a $C_{1-15}$ alkylene group or a $C_{4-10}$ divalent alicyclic hydrocarbon group, and s is 0 or 1.

The carboxylate group is a group wherein a carboxyl group (—COOH) forms an ionic bond with a salt group, and it is preferably a quaternary ammonium salt group of a carboxyl group.

The unit (a4-1) is preferably a unit obtained by polymerizing a terminal unsaturated carboxylic acid selected from 3-butenoic acid, 4-pentenoic acid, 2-hexenoic acid, 3-hexenoic acid, 5-hexenoic acid, 2-heptenoic acid, 3-heptenoic acid, 6-heptenoic acid, 3-octenoic acid, 7-octenoic acid, 2-nonenoic acid, 3-nonenoic acid, 8-nonenoic acid, 9-decenoic acid, 10-undecenoic acid, 3-allyloxy propionic acid, allyloxy valeric acid, monovinyl adipate, vinyl crotonate, monovinyl succinate and maleic acid, wherein a part or whole of the carboxyl group forms a salt, or a unit obtained by polymerizing the terminal unsaturated carboxylic acid, of which a part or whole is in the form of a salt. The terminal unsaturated carboxylic acid is preferably 10-undecenoic acid or 3-allyloxy propionic acid from the viewpoint of availability or copolymerizability.

In the formula (a4-1), —COOR³ is a carboxylate group in which a part may be a carboxyl group. Based on the total amount of the carboxyl group and carboxylate group, io which are present in the fluorocopolymer (A), the proportion of the carboxylate group is preferably at least 60 mol %, particularly preferably at least 65 mol %.

$R^3$ in —COOR³ may be optionally changed by the type of an amine used for forming the salt. Examples of the amine will be mentioned later. In the present invention, the —COOR³ moiety is preferably —COO⁻.(N⁺HZ¹Z²Z³). Here, N⁺HZ¹Z²Z³ is a quaternary ammonium, and it may be one type or two or more types. Each of $Z^1$, $Z^2$ and $Z^3$ is independently a hydrogen atom, a $C_{1-4}$ alkyl group or a $C_{1-6}$ hydroxyalkyl group.

The unit (4) other than the unit (4a-1), is preferably a unit represented by the following formula (a4-2):

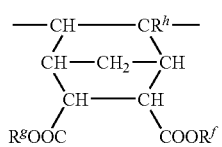

(In the formula (a4-2), —COOR^f is a carboxylate group in which a part may be a carboxyl group, —COOR^g is the same group as the —COOR^f or an alkoxy carbonyl group wherein the alkyl group moiety is a $C_{1-4}$ alkyl group, and $R^h$ is a hydrogen atom or a methyl group.)

As the unit (a4-2), a unit obtained by polymerizing a monoalkyl ester of 5-norbornene-2,3-dicarboxylic acid and its salt may be exemplified.

The proportion of the unit (4) is from 0.4 mol % to less than 4 mol %, preferably from 0.4 to 3.9 mol %, particularly preferably from 1.4 to 3.9 mol %, especially preferably from 2.0 to 3.9 mol %.

When the proportion of the unit (4) is in the above range, the dispersibility of the fluorocopolymer (A) and the stability of the composition will improve. Further, the water resistance and water permeability of a coating film to be formed by the fluorocopolymer (A) will significantly improve.

As the unit (5) to be optionally contained in the fluorocopolymer (A) of the present invention, a polymerized unit of ethylene is exemplified. The fluorocopolymer (A) is preferably a copolymer containing no unit (5). That is, the fluorocopolymer (A) is preferably a copolymer containing the units (1), (2), (3) and (4), or a copolymer containing the units (a1), (a2), (a3) and (a4-1).

The particularly preferred constitution of the fluorocopolymer (A) is from 45 to 55 mol % of the unit (a1), from 14 to 45.6 mol % of the unit (a2), from 8 to 25 mol % of the unit (a3), from 1.4 to less than 4 mol % of the unit (a4-1) and/or the unit (a4-2) and 0 mol % of the unit (a5) (that is, the unit (a5) is not present).

The fluorocopolymer (A) is a copolymer obtained by solution polymerization. A method of solution polymerization is described in the explanation of "PROCESS FOR PRODUCING AQUEOUS COATING COMPOSITION". It is disadvantageous to obtain the fluorocopolymer (A) and the fluorocopolymer (B) of the present invention by emulsion polymerization, since it is thereby necessary to heavily use an emulsifier. With respect to the fluorocopolymer (A) obtained by solution polymerization, when it is dispersed in water as applied in the form of a coating composition, its dispersed particles will easily be fused to each other, and the copolymer thus has an advantage of forming a uniform film. On the other hand, water-dispersed particles obtained by emulsion polymerization will hardly be fused to each other, whereby it is difficult to form a uniform film.

The fluorocopolymer (A) is preferably from 10 to 100 mass %, more preferably from 55 to 100 mass %, based on the total mass of the synthetic resin contained in the aqueous coating composition. 100% means that another synthetic resin (C) to be described later, is not contained. When the proportion of the fluorocopolymer (A) is at least 55 mass %, it is possible to obtain an aqueous coating composition excellent in weather resistance.

Further, the number average molecular weight of the fluorocopolymer (A) is preferably in a range of from 3,000 to 200,000. By adjusting the molecular weight within the range, there are advantages such that the weather resistance, coating property, appearance, etc. of is a coating film will improve. When the molecular weight distribution (Mw/Mn) is from 2.0 to 4.0, the performance of the present invention will be obtained, and especially, gelation will be prevented, whereby the stability will be high.

Aqueous Medium

The aqueous coating composition of the present invention contains an aqueous medium. The aqueous medium is a medium composed of only water or of water and a small amount of an organic solvent. The content of the organic solvent is from 0 to 1 mass % based on the total mass of the composition. 0 Mass % means no organic solvent is contained, or even if it is contained, the amount is lower than the detection limit. The upper limit of the content of the organic solvent is 1 mass %, preferably 0.5 mass %, especially preferably 0.3 mass %, in the composition. Since the fluorocopolymer (A) of the present invention is excellent in stability in the aqueous medium, without incorporating or incorporating a small amount of the organic solvent, the good stability is secured for along period of time.

The organic solvent is not necessarily optionally added. The case where the organic solvent is contained in the composition may be a case where the organic solvent used in a polymerization step of a fluorocopolymer (B) to be described later, remains. For example, the organic solvent is preferably a water-soluble organic solvent, particularly preferably acetone, methyl ethyl ketone, ethanol, methanol or the like.

Another Component

The aqueous coating composition of the present invention may contain another component other than the fluorocopolymer (A). Such another component may be a synthetic resin (C) other than the fluorocopolymer (A). The synthetic resin (C) may be dispersed or dissolved in water together with the fluorocopolymer (A). The synthetic resin (C) may be a synthetic resin of a fluorine type, a phenol type, an alkyd type, a melamine type, a urea type, a vinyl type, an epoxy type, a polyester type, a polyurethane type, an acryl type or the like.

The synthetic resin (C) preferably includes a fluorine type synthetic resin. The fluorine type synthetic resin may be a fluorocopolymer described in Japanese Patent No. 2,955,336 containing, as essential constituents, a polymerized unit derived from a fluoroolefin and a polymerized unit derived from a macromonomer having a hydrophilic moiety.

Here, the hydrophilic moiety is a moiety having a hydrophilic group, a moiety having a hydrophilic bond, or a moiety made of their combination. Further, the macromonomer is a low molecular weight polymer or oligomer having a radical-polymerizable unsaturated group at one terminal.

The synthetic resin (C) preferably includes an acrylic type synthetic resin from the viewpoint of weather resistance.

When the synthetic resin (C) is contained, the amount is preferably from more than 0 to 20 mass %, more preferably from 10 to 20 mass %, in the aqueous coating composition. In a case where the synthetic resin (C) is to be incorporated, after a composition containing the fluorocopolymer (A) is prepared, it is preferred to add the synthetic resin (C) thereto, followed by stirring to have it contained in the composition. The solid content concentration of the synthetic resin (C) is preferably from 3 to 50 mass %, more preferably from 30 to 50 mass %.

The aqueous coating composition of the present invention preferably optionally contain an additive such as a coalescent, a leveling agent, a thickener, an ultraviolet-absorber, a light stabilizer or an antifoaming agent.

The coalescent may, for example, be diethylene glycol monoethyl ether acetate, 2,2,4-trimethyl-1,3-pentadiol mono (2-methylpropanate) or diethylene glycol diethyl ether.

The leveling agent may, for example, be preferably a polyether-modified polydimethylsiloxane or a polyether-modified siloxane.

The thickener may, for example, be preferably a polyurethane type associative thickener.

As the ultraviolet absorber, it is possible to use various known ones. Especially, the ultraviolet absorber suitable for use for top coating as a transparent coating material may, for example, be a salicylate such as methyl salicylate, phenyl salicylate, cresyl salicylate or benzyl salicylate; a benzophenone such as 2-hydroxybenzophenone, 2-hydroxy-4-benzyloxybenzophenone, 2-hydroxy-4-octoxybenzophenone, 2-hydroxy-5-chlorobenzophenone, 2-aminobenzophenone or a high-molecular-weight-modified product sold as T-57 by ADEKA. ARGUS; a benzotriazole such as 2-(2'-hydroxy-5'-t-butylphenyl)benzotriazole, 2-(2'-hydroxy-5'-t-butylphenyl-5-chlorobenzotriazole, 2-(2'-hydroxy-5'-methoxyphenyl)benzotriazole, 2-(2'-hydroxy-3',5'-di-neopentylphenyl) benzotriazole or a high-molecular-weight-modified product sold as TINUVIN 900, 1130 by CIBA GEIGY; a substituted acrylonitrile such as ethyl 2-cyano-3,3-diphenylacrylate, 2-ethylhexyl 2-cyano-3,3-diphenylacrylate or methyl α-cyano-β-methyl-4-methoxycinnamate; a nickel complex salt such as 2,2'-thiobis(4-octylphenolate)nickel complex salt or [2,2'-thiobis(4-t-octylphenolate)]-n-butylamine/nickel complex salt; an ultraviolet absorber such as dimethyl p-methoxybenzylidene malonate, resorcinol monobenzoate, triamide hexamethylphosphate or 2,5-diphenyl-p-benzoquinone; or bis(2,2,6,6-tetramethyl-4-piperidine)sebacate, a polycondensate of dimethyl succinate-1-(2-hydroxyethyl)-4-hydroxy-2,2,6,6-tetramethylpiperidine, or bis(1,2,2,6,6-pentamethyl-4-piperidyl) 2-(3,5-di-t-butyl-4-hydroxylbenzyl)-2-n-butylmalonate. They may be used alone or in combination as a mixture of two or more types of them.

The ultraviolet-absorber is used preferably within a range of from 0.1 to 15 parts by mass, more preferably within a range of from 0.1 to 5 parts by mass, per 100 parts by mass of the solid content concentration of the synthetic resin. If the amount of the ultraviolet absorber is too small, no adequate effect of improvement of light resistance is obtainable, and if it is too large, the effect tends to be saturated, such being not satisfactory.

The light stabilizer may, for example, be a light stabilizer of a hindered amine type, such as MARK LA57, 62, 63, 67 or 68 manufactured by ADEKA ARGUS, or TINUVIN 622LD manufactured by CIBA GEIGY. They may be used alone or as a mixture of two or more types of them in combination with an ultraviolet-absorber.

The antifoaming agent may be a fatty acid salt, a fatty alcohol sulfate, a liquid fatty oil sulfuric acid ester, a sulfate of an aliphatic amine or an aliphatic amide, an aliphatic alcohol phosphoric acid ester, a sulfonate of a dibasic fatty acid ester, a fatty acid amide sulfonate, an alkylallyl sulfonate, a naphthalene sulfonate of a formalin condensate, a polyoxyethylene alkyl ether, a polyoxyethylene alkylphenol ether, a polyoxyethylene alkyl ester, a sorbitan alkyl ester, a polyoxyethylene sorbitan alkyl ester, an acrylic polymer, a silicone mixed acrylic polymer, a vinyl type polymer or a polysiloxane compound.

Further, when it is required to adjust the gloss of a coating film, an inorganic or organic flatting agent of common use may be added. Further, when coloration is required, a colorant such as a commercially available organic pigment, inorganic pigment, organic dye, or a composite pigment or dye of them, may be dispersed or added/mixed.

In order to increase the stability more, a stabilizer such as an emulsifier may be added within a range where the water resistance and the weather resistance of the coating film are not deteriorated.

The emulsifier is preferably an anionic emulsifier or nonionic emulsifier, or they may be used in combination.

The nonionic emulsifier is preferably an alkylphenol ethylene oxide adduct, a fatty alcohol ethylene oxide adduct or a block copolymer of ethylene oxide and propylene oxide.

The amount of the nonionic emulsifier to be added may be suitably selected, and it is preferably from 0 to 3 parts by weight per 100 parts by mass of the solid content of the synthetic resin.

The anionic emulsifier is preferably an alkylbenzene sulfonate, an alkylnaphthalene sulfonate, a higher fatty acid salt, an alkylsulfuric acid ester salt, an alkyl ether sulfuric acid ester salt or a phosphoric acid ester salt.

The amount of the anionic emulsifier to be added may also be suitably selected, and it is preferably from 0 to 1 part by weight per 100 parts by mass of the solid content of the synthetic resin.

The timing to add the emulsifier is preferably after a step of adding water, which is described later.

Process for Producing Aqueous Coating Composition

The aqueous coating composition of the present invention is preferably produced by carrying out sequentially a step of neutralizing a part or whole of the carboxyl group in the fluorocopolymer (B) by adding a basic compound to the fluorocopolymer (B); a step of adding water; and a step of removing the organic solvent.

The fluorocopolymer (B) is a copolymer having the unit (1), the unit (2), the unit (3), the unit (4-3), and optionally, the unit (5).

The fluorocopolymer (B) is preferably a copolymer having the unit (a1), the unit (a2), the unit (a3), the unit (a4-3), and optionally, the unit (a5).

Here, the unit (4-3) is a unit having a carboxyl group bonded thereto, and the carboxyl group does not form a salt. The preferred unit (4-3) is represented by the following formula (a4-3).

The proportion of each unit in the fluorocopolymer (B) is preferably from 40 to 60 mol % of the unit (1), from 3 to 50 mol % of the unit (2), from 4 to 30 mol of the unit (3), from 0.4 to less than 4 moll of the unit (a4-3), and from 0 to 20 mol % of the unit (5). The proportion of each unit is usually maintained when the fluorocopolymer (B) is obtained by the above production process, and the proportion of the unit (4-3) is the same as the proportion of the unit (4):

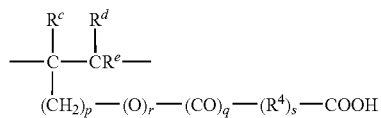
(a4-3)

(In the formula (a4-3), $R^c$ is a hydrogen atom or a methyl group, $R^d$ is a hydrogen atom or a methyl group, $R^e$ is a hydrogen atom or —COOH, p is 0 or 1, r is 0 or 1, q is 0 or 1, $R^4$ is a $C_{1-15}$ alkylene group or a $C_{4-10}$ divalent alicyclic hydrocarbon group, and s is 0 or 1.)

An example of the unit (4) other than the above may be a unit represented by the following formula (a4-4):

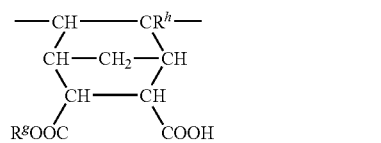
(a4-4)

(In the formula (a4-4), $R^g$ is a hydrogen atom or a $C_{1-4}$ alkyl group, and $R^h$ is a hydrogen atom or a methyl group.)

The fluorocopolymer (B) is obtained by a copolymerization reaction in an organic solvent. The copolymerization reaction is preferably carried out by copolymerizing a fluoroolefin (B1), a vinyl monomer or allyl monomer (B2), a vinyl monomer having a hydroxyl group bonded thereto or allyl monomer having a hydroxyl group bonded thereto (B3), and a vinyl monomer or allyl monomer having a carboxyl group bonded thereto (B4). Further, if necessary, another monomer (B5) may be used for the copolymerization reaction.

Here, to the monomer (B2), no hydroxyl group and/or carboxyl group is bonded. To the monomer (B3), no carboxyl group is bonded.

An example of producing the fluorocopolymer (B) may be an example of obtaining it by copolymerizing a monomer represented by the following formula (b1), a monomer represented by the following formula (b2), a monomer represented by the following formula (b3), a monomer represented by the following formula (b4-1) and an optional another monomer, in an organic solvent. Further, when it is desired to obtain the unit (4-2), it is preferred to use a monomer represented by the following formula (b4-2). Here, symbols in these formulae have the same meanings as above:

(b1)

(b2)

(b3)

(b4-1)

(b4-2)

The copolymerization is carried out in such a manner that in the coexistence or absence of a polymerization catalyst, a polymerization initiating source such as a polymerization initiator or ionizing radiation is acted in the presence of a basic compound.

The polymerization initiator may be a peroxyester type peroxide such as t-butylperoxy acetate, a dialkylperoxy dicarbonate such as diisopropyl peroxydicarbonate, benzoyl peroxide or azobisisobutyronitrile.

The basic compound may be selected from a wide range including an organic basic compound and an inorganic basic compound. The organic basic compound is preferably an alkylamine such as triethylamine or dimethylaminoethanol, or an alkylphosphine such as triethylphosphine.

The inorganic basic compound is preferably a hydrotalcite, or a carbonate, hydroxide or oxide of an alkali metal or an alkali earth metal, such as potassium carbonate, potassium hydroxide, sodium hydroxide, magnesium hydroxide, aluminum hydroxide, magnesium oxide or aluminum oxide. The hydrotalcite is preferably a double salt of magnesium and aluminum.

The amount of the polymerization initiator may suitably be changed depending on the type or the copolymerization reaction condition, but usually, it is from 0.05 to 1.5 mass %, preferably from 0.1 to 0.5 mass %, based on the total amount of monomers which should be copolymerized.

The amount of the basic compound to be used is preferably from 0.01 to 5 mass %, more preferably from 0.1 to 3 mass %, based on the total amount of monomers which should be copolymerized.

For the above copolymerization reaction, solution polymerization is used. The polymerization solvent is preferably an alcohol, an ester, a ketone, a saturated halogenated hydrocarbon containing at least one fluorine atom or an aromatic hydrocarbon such as xylene, particularly preferably a water-soluble organic solvent, especially preferably acetone, methyl ethyl ketone, ethanol or methanol.

The reaction temperature of the copolymerization reaction is preferably from 10° C. to 90° C., more preferably from 35 to 70° C. Further, the reaction pressure is preferably from 0 to 100 kg/cm²·G, more preferably from 1 to 50 kg/cm²·G.

The intrinsic viscosity of the fluorocopolymer (B) is preferably from 0.05 to 2.0 dL/g, more preferably from 0.05 to 1.00 dL/g. By using a reaction solvent having a relatively large chain transfer constant, or by carrying out the reaction in the coexistence of a suitable chain transfer agent, it is possible to control the intrinsic viscosity to be in the above range.

The number average molecular weight of the fluorocopolymer (B) is preferably in a range of from 3,000 to 200,000. BY adjusting the molecular weight in such a range, there will be an advantage such that the weather resistance, coating property, appearance, etc., of the coating film will improve.

Step for Neutralization

The step for neutralization is a step of neutralizing a part or whole of the carboxyl group in the fluorocopolymer (B) by adding a basic compound to an organic solvent solution of the fluorocopolymer (B) obtained by carrying out solution polymerization, thereby to form a carboxylate group.

The step for neutralization is more preferably carried out by adding a basic compound or an aqueous solution of a basic compound to an organic solvent having the fluorocopolymer (B) dissolved therein, while stirring at room temperature for several tens minutes.

The amount of the basic compound may suitably be changed depending on the amount of the carboxylic group desired to be changed to the salt group.

After the step for neutralization, a step of adding water is carried out. When the aqueous solution of a basic compound is used, the next step of adding water may or may not be carried out. Especially, it is preferred to use the aqueous solution of a basic compound for the step for neutralization and to carry out the step of adding water. The amount of water is preferably an amount so that the solid concentration of the fluorocopolymer (B) becomes from 3 to 50 mass %, more preferably an amount so that the solid concentration becomes from 20 to 45 mass %.

The basic compound to be used for the step for neutralization, is preferably selected from compounds having a boiling point of at most 200° C. since the basic compound will then scarcely remain in the coating film.

The basic compound may, for example, be ammonia, a primary, secondary or tertiary amine such as monomethylamine, dimethylamine, trimethylamine, monoethylamine, diethylamine, triethylamine, monoisopropylamine, diisopropylamine, triisopropylamine, monobutylamine or dibutylamine; an alkanolamine such as monoisopropanolamine, dimethylaminoethanol or diethylaminoethanol, or methyldiethanolamine; a diamine such as ethylenediamine, propylenediamine, tetramethylenediamine or hexamethylenediamine; an alkyleneimine such as ethyleneimine or propyleneimine; or pyridine such as piperazine, morpholine or pyrazine.

Among them, the basic compound is preferably an alkylamine, an alkanolamine or a diamine.

Step of Removing Organic Solvent

In the step of removing the organic solvent, the organic solvent is removed. Accordingly, it is possible to obtain the aqueous coating composition of the present to invention having at most 1 mass % of the organic solvent based on the total mass. Removing the solvent can be carried out by distillation under reduced pressure.

Two-Pack Type Curble Aqueous Coating Material Kit

The two-pack type curable aqueous coating material kit of the present invention comprises the aqueous coating composition of the present invention and a curing agent, independently. The two-pack type curable aqueous coating material kit of the present invention is used after the aqueous coating composition and the curing agent are mixed at the time of use.

By selecting the curing agent, it becomes possible to carry out crosslinking by drying at room temperature, and it is possible to form a coating film by applying the aqueous coating composition and the curing agent. When heating is needed for crosslinking, a coating film may be formed by heating and baking.

The curing agent is a water-soluble or water-dispersible curing agent having a functional group reactive with a hydroxyl group or a carboxyl group.

The curing agent may be an isocyanate compound, a melamine resin, a phenol resin, a xylene resin or a toluene resin. Especially, an isocyanate compound is preferred since it is easy to obtain a coating film excellent in weather resistance and mechanical property.

The isocyanate compound is preferably one mechanically dispersed in water or a self-emulsifiable polyisocyanate compound. The self-emulsifiable polyisocyanate compound is a compound which can be emulsified and dispersed in water without an emulsifier.

The polyisocyanate compound which is mechanically dispersed in water may be an aliphatic polyisocyanate such as hexamethylene diisocyanate; an aromatic polyisocyanate such as m- or p-phenylene diisocyanate, 2,4- or 2,6-tolylene diisocyanate, diphenylmethane-4,4'-diisocyanate, naphthalene-1,5-diisocyanate or 4,4'-diisocyanate-3,3'-dimethyl-diphenyl; an alicyclic polyisocyanate such as bis-(isocyanatecyclohexyl)methane or isophorone diisocyanate; a crude polyisocyanate such as crude tolylene diisocyanate or crude diphenylmethane diisocyanate; or a modified polyisocyanate such as carbodiimide-modified diphenylmethane diisocyanate, polyol-modified diphenylmethane diisocyanate or polyol-modified hexamethylene diisocyanate.

Such a polyisocyanate is one in a form of a dimer or trimer of a burette type, an isocyanurate ring type or an uretodione type, or a blocked polyisocyanate wherein an isocyanate group is reacted with a blocking agent. The blocking agent may be an alcohol, a phenol, a caprolactam, an oxime or an active methylene compound. Such polyisocyanates may be used in combination as a mixture of two or more of them.

Such a polyisocyanate is used as one mechanically dispersed in water, and by adding an emulsifier at the time of such dispersion, it is possible to obtain a more stable dispersion. The polyisocyanate to be mechanically dispersed in water is preferably one having relatively low viscosity. Here, as the emulsifier to be used, any known one may be used without any particularly limitation, but one having ionicity, particularly one having an active hydrogen atom, is not preferred, since it undergoes a reaction at the time of dispersion, whereby it becomes thickened, or the dispersibility decreases. A nonionic emulsifier, particularly an emulsifier having a polyoxyethylene chain, is preferred.

A blocked polyisocyanate will not usually be cured unless the temperature is at least 140° C., whereby when curing is desired to be carried out at a lower temperature, it is preferred to use a polyisocyanate which is not blocked.

Further, the self-emulsifiable polyisocyanate compound may, for example, be a prepolymer obtained by reacting a hydrophilic polyoxyalkylene with the polyisocyanate as described above. Here, the hydrophilic polyoxyalkylene used for the reaction is preferably one having at least one isocyanate reactive group and a molecular weight in a range of from 200 to 4,000. Particularly preferably, it is a polyoxyalkylene polyol or polyoxyalkylene monool having a molecular weight in a range of from 300 to 1,500. With one having a low molecular weight, sufficient self-emulsifiability is not achieved, and with one having a high molecular weight, even though the self-emulsifiability is good, the stability in water is deteriorated, and the crystallinity becomes high, whereby the storage stability at a low temperature becomes deteriorated, and turbidity is formed. The oxyalkylene chain in a polyoxyalkylene, is preferably one such that whole or most of it is an oxyethylene group.

Such a reaction of a polyisocyanate with a polyoxyalkylene glycol can be carried out in the presence of a catalyst such as a tertiary amine, an alkyl-substituted ethyleneimine, a tertiary alkylphosphine, a metal alkyl acetonate or an organic metal salt, and if necessary, in the presence of a promoter, at a temperature of at most 100° C. Further, with respect to the reaction, it is suitable to adjust the amount of the remaining isocyanate group to be from 10 to 24 mass %, preferably from 15 to 22 mass %.

If the amount of the remaining isocyanate group is small, the reactivity with the fluorocopolymer will sometimes decrease, such being undesirable. Further, in order to achieve a sufficient degree of crosslinking, a large amount of an isocyanate compound will be required, whereby the weather resistance of a coating film may sometimes be adversely affected, such being undesirable. If the amount of the remaining isocyanate group is too large, a stable emulsion is rarely formed, such being undesirable. Such a self-emulsifiable isocyanate compound is described in JP-B-4-15279, etc.

The melamine resin may be a melamine resin which is alkyl-etherified such as methyl-etherified, butyl-etherified or isobutyl-etherified, and it is preferably a melamine resin having at least a part of it is methyl-etherified from the viewpoint of water-solubility.

The mass ratio of the aqueous coating composition of the present invention to the curing agent, in the two-pack type curable aqueous coating material kit, is preferably 50 to 95 mass %: 5 to 50 mass %, more preferably 75 to 95 mass %: 5 to 25 mass %, in a nonvolatile composition.

EXAMPLES

Now, the present invention will be described in further detail with reference to Examples, but the present invention is by no means restricted thereto. The term "parts" in Examples means "parts by mass" unless otherwise specified. Here, Examples 1 to 7 and Examples 10 to 15 are Examples of the present invention, and Examples 8 and 11 are Reference Examples of the present invention, and Comparative Examples 1 to 8 are Comparative Examples of the present invention.

Evaluation of Stability of Aqueous Coating Composition

By the process in each of Synthesis Examples 1 to 9, an aqueous liquid having a fluorocopolymer dispersed or dissolved in water, was synthesized. Further, the synthetic resin in each of Synthesis Examples 1 to 6 and Synthesis Example 9, corresponds to the fluorocopolymer (A) of the present invention. Furthermore, the synthetic resin in each of Synthesis Examples 7 and 8, is a copolymer different from the fluorocopolymer (A) in the ratio of units.

Synthesis Example 1

Into a stainless autoclave equipped with a stirrer and having an inner volume of 250 cc (pressure resistance: 50 kg/cm$^2$·G), 10.8 parts of ethyl vinyl ether (EVE), 16.7 parts of cyclohexyl vinyl ether (CHVE), 15.4 parts of ω-hydroxybutyl vinyl ether (HBVE), 4.9 parts of 10-undecenoic acid (UDA), 30 parts of methyl alcohol (MeOH), 37 parts of methyl ethyl ketone (MEK), 0.6 part of tertiary butylperoxypivalate and 0.36 part of dimethylethanolamine (DMAE) were introduced, and dissolved air was removed by deaeration under cooling, whereupon 52.5 parts of chlorotrifluoroethylene (CTFE) was introduced, and a reaction was carried out at 50° C. for 24 hours. After purging and filtration, a varnish of a fluorocopolymer having a solid content of 60.4 mass % was obtained.

The molecular weight of the fluorocopolymer in the obtained varnish was measured by GPC, and Mn=1.1×10$^4$ by a number average as calculated as polystyrene, and the acid value was 15 mgKOH/g.

By this acid value, it was confirmed that the fluorocopolymer constituting the varnish contained about 3 mol % of a unit derived from UDA.

Then, to 167 parts of the varnish of the polymerized fluorocopolymer, 1.85 parts of triethylamine was added, followed by stirring at room temperature for 30 minutes, to neutralize 70% of a carboxyl group in the unit derived from UDA, and 150 parts of deionized water was gradually added thereto. Consequently, about 2.1 mol % out of about 3 mol % in the unit derived from UDA, was neutralized.

Lastly, MeOH and MEK as remaining solvents were distilled under reduced pressure until their total amount became less than 2 mass % of the solid content of the fluorocopolymer. Further, deionized water was added to adjust the solid content concentration to 40 mass % thereby to obtain an aqueous liquid of Synthesis Example 1. The amount of remaining solvents in the aqueous liquid was measured and found to be 0.4 mass %. Here, for measuring the amount of remaining solvents in the aqueous liquid, gas chromatography GC-14B manufactured by Shimadzu Corporation was used (the same applies to the following Synthesis Examples).

In Synthesis Example 1, the raw material ratio (parts by mass) at the time of polymerization, the molecular weight Mn before neutralization, the acid value, the hydroxyl value, the ratio of triethyleneamine (parts by mass based on 167 parts of varnish) used for neutralization, the amount of remaining solvents after distillation under reduced pressure, and the unit ratio of the obtained synthetic resin in the aqueous liquid, are shown in Table 1.

In Table 1, MA represents maleic acid, and Ca crotonic acid. KYOWARD 500SH is an acid absorbent (an inorganic basic compound) manufactured by Kyowa Chemical Industry Co., Ltd.

Further, (a1) represents mol % of a unit derived from CTFE, (a2) the total mol % of a unit derived from EVE and a unit derived from CHVE, (a3) mol % of a unit derived from HBVE, (a4)-a mol % of a unit derived from UDA, MA or CA having no carboxyl group neutralized, and (a4)-b mol % of a unit derived from UDA, MA or Ca wherein a carboxyl group is neutralized to form a carboxylate group.

Further, the hydroxyl value in Table 1 is represented by a value of "the molar ratio of HBVE used"×5.

Further, the structural unit ratio of a synthetic resin in the aqueous solution was represented by a value obtained by calculating the raw material ratio (parts by weight) at the time of polymerization by mol. However, the ratios of (a4)-a and (a4)-b represented by values obtained by calculation from the acid value before neutralization and the amount of triethylamine required for the neutralization.

Synthesis Example 2

An aqueous liquid of Synthesis Example 2 was obtained in the same manner as in Synthesis Example 1 except that the monomer amounts, the solvent amounts, the types and amounts of other additives and the amount of triethylamine used were changed to the amounts shown in Table 1, 50 mass % of EtOH used as a solvent after the polymerization, was substituted with a solvent, MEK and in distillation of the solvents, the remained solvents were distilled under reduced pressure until their total amount became 15 parts by mass of the solid content of the fluorocopolymer.

Synthesis Examples 3, 4, 6 and 9

Aqueous liquids of Synthesis Examples 3, 4, 6 and 9 were obtained in the same manner as in Synthesis Example 1 except that the monomer amounts, the solvent amounts, the types and amounts of other additives, and the amount of triethylamine used were changed to the amounts shown in Table 1.

Synthesis Examples 5 and 8

Aqueous liquids of Synthesis Examples 5 and 8 were obtained in the same manner as in Synthesis Example 1 except that the monomer amounts, the solvent amounts, the types and amounts of other additives, and the amount of triethylamine used were changed to the amounts shown in Table 1, and in distillation of the solvents, the remained solvents were distilled under reduced pressure until their total amount became 15 parts by mass of the to solid of the fluorocopolymer.

Synthesis Example 7

An aqueous liquid of Synthesis Example 7 was obtained in the same manner as in Synthesis Example 1 except that the monomer amounts, the solvent amounts, the types and amounts of other additives, and the amount of triethylamine used were changed to the amounts shown in Table 1, and about 50 mass % of EtOH used as a solvent after the polymerization, was substituted with a solvent, MEK.

In each of Synthesis Examples 2 to 9, the raw material ratio (parts by mass) at the time of polymerization, the molecular weight Mn before neutralization, the acid value, the hydroxyl value, the ratio of triethyleneamine (parts by mass based on 167 parts of varnish) used for neutralization, and the measured value of the amount of remaining solvent in the obtained aqueous liquid and the unit ratio of the synthetic resin, are shown in Table 1 in the same manner as in Synthesis Example 1.

TABLE 1

|  |  |  | Syn. Ex. 1 | Syn. Ex. 2 | Syn. Ex. 3 | Syn. Ex. 4 | Syn. Ex. 5 | Syn. Ex. 6 | Syn. Ex. 7 | Syn. Ex. 8 | Syn. Ex. 9 |
|---|---|---|---|---|---|---|---|---|---|---|---|
| Raw material ratio at the time of polymerization | CTFE | parts by mass | 52.2 | 52.7 | 52 | 52.7 | 56.6 | 55.3 | 50.7 | 49.7 | 52.7 |
|  | EVE | parts by mass | 10.8 | 13.6 | 9.5 | 12.9 | 18.7 | 16.9 | 10.5 | 9.1 | 12.9 |
|  | CHVE | parts by mass | 16.7 | 16.8 | 16.7 | 19.1 | 0 | 7.2 | 16.2 | 15.9 | 19.1 |
|  | HBVE | parts by mass | 15.4 | 10.4 | 18.4 | 10.4 | 22.3 | 16.3 | 10 | 9.8 | 10.4 |
|  | UDA | parts by mass | 4.9 | 6.4 | 3.2 | 4.9 | — | — | 12.6 | 15.5 | 4.9 |
|  | CA | parts by mass | — | — | — | — | 2.5 | — | — | — | — |
|  | MA | parts by mass | — | — | — | — | — | 4.2 | — | — | — |
|  | MeOH | parts by mass | — | — | 40 | — | 40 | 40 | — | — | — |
|  | EtOH | parts by mass | 30 | 67 |  |  |  |  | 67 |  |  |
|  | MEK | parts by mass | 37 |  | 27 | 67 | 27 | 27 |  | 67 | 67 |
|  | K2CO3 | parts by mass | — | — | 1.5 | — | — | — | — | — | — |
|  | DMAE | parts by mass | 0.36 | — | — | 0.27 | — | 0.36 | 0.5 | — | — |
|  | KYOWARD 500SH | parts by mass | — | 1.2 | — | — | 1 | — | — | 2 | 1.2 |
| After polymerization | Mn | ×10$^4$ | 1.1 | 0.8 | 1 | 1.2 | 1.7 | 1.3 | 1.1 | 0.8 | 1.2 |
|  | Acid value | mgKOH/g | 15 | 19 | 10 | 15 | 15 | 19 | 40 | 50 | 15 |
|  | Hydroxyl value | mgKOH/g | 75 | 50 | 90 | 50 | 100 | 75 | 50 | 50 | 50 |
|  | Triethylamine | parts by mass | 1.85 | 2.1 | 1.26 | 1.85 | 1.85 | 1.52 | 3.6 | 6.3 | 1.85 |
|  | Amount of remaining solvent | mass % | 0.4 | 5.6 | 0.2 | 0.4 | 6.0 | 0.8 | 0.4 | 5.2 | 0.2 |
| Structural unit ratio | (a1) | mol % | 50 | 50 | 50 | 50 | 50 | 50 | 50 | 50 | 50 |
|  | (a2) | mol % | 32 | 36.1 | 30 | 37 | 27 | 33.1 | 32 | 30 | 37 |
|  | (a3) | mol % | 15 | 10 | 18 | 10 | 20 | 15 | 10 | 10 | 10 |
|  | (a4)-a | mol % | 0.9 | 1.6 | 0.6 | 0.9 | 0.9 | 1.9 | 4 | 3 | 0.9 |
|  | (a4)-b | mol % | 2.1 | 2.3 | 1.4 | 2.1 | 2.1 | 2 | 4 | 7 | 2.1 |

Synthesis Example 10

Into a stainless steel autoclave equipped with a stirrer and having an inner volume of 2,000 cc (pressure resistance: 50 kg/cm$^2$·G), 27.3 parts of ethyl vinyl ether (EVE), 47.7 parts of cyclohexyl vinyl ether (CHVE), 49.8 parts of ω-hydroxybutyl vinyl ether (HBVE), 45 parts of 10-undeceonoic acid (UDA), 415 parts of methyl alcohol (MeOH), 277 parts of methyl ethyl ketone (MEK) and 4.5 part of dimethylethanolamine were introduced, followed by cooling with a liquid nitrogen to remove dissolved air by solidification/deaeration, whereupon 153 parts of chlorotrifluoroethylene (CTFE) was introduced, and stirring was started to raise a temperature to 50° C. The pressure at the time when the temperature reached 50° C. was 0.3 MPa. By adding 3.0 parts of a 50 mass % xylene solution of tertiary butylperoxypivalate, the reaction was started. After the initiation of polymerization, 343 parts of CTFE, 64 parts of EVE, 111 parts of CHVE, 106 parts of HBVE and 17 parts of a 50 mass % xylene solution of tertiary butylperoxypivalate were continuously added over about 8 hours. After the completion of continuous addition, stirring was continued for 16 hours at 50° C. After cooling and purging, 0.1 part of hydroquinone monomethyl ether was added, followed by filtration to obtain a varnish of a fluorocopolymer having 59.5 mass % of a solid content.

The molecular weight of the fluorocopolymer in the obtained varnish was measured by GPC, and Mn=0.9×10$^4$ by a number average as calculated as polystyrene, and the acid value was 16 mgKOH/g.

By this acid value, it was confirmed that the fluorocopolymer constituting the varnish contained about 3 mol % of a unit derived from UDA.

Then, to 167 parts of the varnish of the polymerized fluorocopolymer, 1.85 parts of triethylamine was added, followed by stirring at room temperature for 30 minutes, to neutralize 70% of a carboxyl group in the unit derived from UDA, and 150 parts of deionized water was gradually added thereto. Consequently, about 2.1 mol % out of about 3 mol % in the unit derived from UDA, was neutralized.

Lastly, MeOH and MEK as remaining solvents were distilled under reduced pressure until their total amount became less than 0.5 mass % of the solid content of the fluorocopolymer. Further, 150 parts of deionized water was added to adjust the solid concentration to 40 mass % thereby to obtain an aqueous liquid of Synthesis Example 9. The amount of remaining solvents in the aqueous liquid was measured and found to be 0.5 mass %.

The unit ratio (mol %) of the synthetic resin in the aqueous liquid of Synthesis Example 10, which was obtained in the same manner as in each of Synthesis Examples 1 to 8, was such that (a1):(a2):(a3):(a4)-a:(a4)-b=50:30:17:0.9:2.1.

Examples 1 to 6 and Comparative Examples 1 to 4

100 Parts by mass of the aqueous liquid in each of Synthesis Examples 1 to 10 was maintained in an oven at 50° C. for 2 weeks and 4 weeks, to ascertain the storage stability, and the results are shown in Table 2. The Mn change rate represents a value obtained by dividing the value of the molecular weight Mn after maintaining at 50° C., by the initial Mn (shown in Table 1). An increase of Mn means gelation or a sign of gelation.

TABLE 2

|  |  | Ex. 1 Syn. EX. 1 | Ex. 2 Syn. EX. 3 | Ex. 3 Syn. EX. 4 | Ex. 4 Syn. EX. 6 | Ex. 5 Syn. EX. 9 | Ex. 6 Syn. EX. 10 | Comp. Ex. 1 Syn. EX. 7 | Comp. Ex. 2 Syn. EX. 8 | Comp. Ex. 3 Syn. EX. 2 | Comp. Ex. 4 Syn. EX. 5 |
|---|---|---|---|---|---|---|---|---|---|---|---|
| Amount of remaining solvents in aqueous solution |  | 0.4 | 0.2 | 0.4 | 0.8 | 0.2 | 0.5 | 0.4 | 5.2 | 5.6 | 6 |
| After maintaining at 50° C. for 2 weeks | Appearance | 1* | 1* | 1* | 1* | 1* | 1* | 2* | 1* | 1* | 1* |
|  | Mn × 10$^4$ | 1.1 | 1.0 | 1.3 | 1.5 | 1.2 | 0.9 | 1.4 | 1.5 | 0.9 | 1.9 |
|  | Mn change rate | 1.0 | 1.0 | 1.1 | 1.2 | 1.0 | 1.0 | 1.3 | 1.9 | 1.1 | 1.1 |
| After maintaining at 50° C. for 4 weeks | Appearance | 1* | 1* | 1* | 1* | 1* | 1* | 2* | 2* | 2* | 2* |

1* No change
2* Sedimentation

As shown in Table 2, in Examples 1 to 6 in which the aqueous liquids of Synthesis Examples 1, 3, 4, 6, 9 and 10 were used, it was possible to confirm that an appearance change such as sedimentation or agglomeration did not take place even though each aqueous liquid was maintained in an oven at 50° C. for 2 weeks and 4 weeks, and that a change in molecular weight was small, and the storage stability was excellent. On the other hand, in Comparative Example 1 in which the aqueous liquid of Synthesis Example 7 was used, sedimentation was observed. Further, in Comparative Example 2 in which the aqueous liquid of Synthesis Example 8 was used, an increase of the molecular weight was observed. In Comparative Examples 3 and 4, during maintaining at 50° C. for 4 weeks, sedimentation was observed.

Water Resistance Evaluation of Coating Film

Examples 7 to 13 and Comparative Examples 5 and 6

To 100 parts by mass of each of Synthesis Examples 1 to 9, DEA, BYK348, BYK080 and SANOL LS765 were added in the amounts as shown in Table 3, followed by stirring and mixing to prepare a coating material. The amount of the remaining solvents in the coating material is shown in Table 3. To the coating material, Bayhydur 3100 was added in the amount as shown in Table 3, followed by stirring and mixing. The resultant was applied by spraying on a test specimen which was a slate board coated with an acrylic emulsion undercoating material, followed by drying at room temperature for 2 weeks, and then, the water resistance was evaluated. Further, the coating material was directly applied by spraying on a slate board having no undercoating material applied thereon, followed by drying at room temperature for 2 weeks as above, and then, the water permeability was evaluated. However, Examples 8 and 11 are Examples wherein the amount of the remaining organic solvents exceeds 1 mass %, and they are Reference Examples.

The names of the respective additives in Table 3 represents the following compounds, respectively. Further, the numerical values in Table 3 are parts by mass unless otherwise specified.

DEA: A coalescent (diethylene glycol monoethyl ether acetate)

Bayhydur 3100: A water-dispersible polyisocyanate, manufactured by Sumika Bayer Urethane Co., Ltd.

BYK348: A leveling agent (polyether-modified polydimethylsiloxane), manufactured by BYK.

BYK080: An antifoaming agent (a silicon type antifoaming agent), manufactured by BYK.

SANOL LS765: A light stabilizer, manufactured by Sankyo.

TINUVIN 1130: An ultraviolet absorber (a condensate with methyl-3-(3-t-butyl-5-(2H-benzotriazol-2-yl)-4-hydroxyphenyl)propionate-polyethylene glycol (molecular amount 300)), manufactured by CIBA GEIGY.

Water Resistance

The test specimen in each of Examples 7 to 13 and Comparative Examples 5 and 6 was immersed in deionized water at room temperature for 2 weeks, and its appearance change was observed. The results are shown in Table 3. Blistering in the evaluation results represents a state such that air bubbles are formed between the coating film and the substrate, whereby the appearance is deteriorated.

Water Permeability

With respect to the test specimen in each of Examples 7 to 13 and Comparative Examples 5 and 6, the amount of permeability was measured in accordance with the method described in JIS K5400. The results are shown in Table 3.

TABLE 3

| Aqueous liquid | Ex. 7 Syn. Ex. 1 | Ex. 8 (Ref. Ex.) Syn. Ex. 2 | Ex. 9 Syn. Ex. 3 | Ex. 10 Syn. Ex. 4 | Ex. 11 (Ref. Ex.) Syn. Ex. 5 | Ex. 12 Syn. Ex. 6 | Ex. 13 Syn. Ex. 9 | Comp. Ex. 5 Syn. Ex. 7 | Comp. Ex. 6 Syn. Ex. 8 |
|---|---|---|---|---|---|---|---|---|---|
| DEA | 3 | 3 | 3 | 3 | 3 | 3 | 3 | 3 | 3 |
| BYK 348 | 0.5 | 0.5 | 0.5 | 0.5 | 0.5 | 0.5 | 0.5 | 0.5 | 0.5 |
| BYK 080 | 1.0 | 1.0 | 1.0 | 1.0 | 1.0 | 1.0 | 1.0 | 1.0 | 1.0 |
| SANOL S765 | 0.5 | 0.5 | 0.5 | 0.5 | 0.5 | 0.5 | 0.5 | 0.5 | 0.5 |
| TINUVIN 1130 | 3 | 3 | 3 | 3 | 3 | 3 | 3 | 3 | 3 |
| Amount of remaining solvents in coating material (mass %) | 0.37 | 5.2 | 0.19 | 0.37 | 5.6 | 0.74 | 0.19 | 0.37 | 4.8 |
| Bayhydur | 13.5 | 9.0 | 16.0 | 9.0 | 16.0 | 13.5 | 14.5 | 9.0 | 9.0 |
| Water resistance | No change | No change | No change | No change | No change | No change | No change | No change | Blistering |
| Amount of permeated water (g/24 h) | 0.15 | 0.19 | 0.13 | 0.13 | 0.15 | 0.22 | 0.15 | 0.25 | 0.41 |

As shown in Table 3, in each of Examples 7 to 13 wherein each of Synthesis Examples 1 to 6 and Synthesis Example 9 was used, the results of the water resistance test did not change, and the amount of permeated water was slight. Therefore, according to the two-pack type curable aqueous coating material kit of the present invention, it was confirmed that a coating film excellent in water resistance could be formed.

Synthesis Example 11

Preparation of Pigment Dispersion

60 Parts of an oxidized titanium pigment CR-90 (manufactured by Ishihara Sangyo Kaisha, Ltd.), 2.9 parts of a Disrol H-14N dispersant (manufactured by Nippon Nyukazai Co., Ltd.), 0.2 part of an FS antifoam 013B antifoaming agent (manufactured by Dow Corning), 38 parts of deionized water and 100 parts of glass beads were mixed, followed by dispersing by using a grain mill disperser, and the glass beads were filtrated to prepare a pigment dispersion.

Synthesis Example 12

To 192.9 parts of deionized water, 20.0 parts of an emulsifier Newcol 707SF, manufactured by Nippon Nyukazai Co., Ltd., 204 parts of 2-ethylhexyl acrylate, 195.8 parts of styrene and 8.2 parts of acrylic acid were added, followed by emulsifying by using a homomixer, and 2.04 parts of ammonium persulfate was added to the resultant, whereupon deaeration was carried out by nitrogen gas under pressure in a glass container, to obtain a liquid which was designated as D liquid.

Into a 1 liter glass reactor equipped with a stirrer, 200 parts of deionized water was introduced, followed by deaeration with nitrogen gas under pressure to raise the temperature to 80° C. To the resultant, 623.24 parts of D liquid was dropwise added by a tube pump over 3.5 hours. After that, 1 part of a 10 mass % aqueous liquid of ammonium persulfate was added thereto, followed by aging for 2.5 hours at a temperature of from 80 to 85° C. Then, the temperature was lowered to 30° C., and the resultant was neutralized with 28 mass % of aqueous ammonia to obtain an aqueous dispersion having a solid content concentration of 50 mass %.

Synthesis Example 13

Into a stainless steel autoclave equipped with a stirrer and having an inner volume of 250 cc (pressure resistance: 50 kg/cm$^2$·G), 7.9 parts of ethyl vinyl ether (EVE), 21.7 parts of cyclohexyl vinyl ether (CHVE), 6.4 parts of ω-hydroxybutyl vinyl ether (HBVE), 6.9 parts of a hydrophilic macromonomer represented by a formula $CH_2=CHO(CH_2)_4(OCH_2CH_2)_nOH$ (Mn: 700), 3 parts of an emulsifier (N-1110, manufactured by Nippon Nyukazai Co., Ltd.), 115 parts of deionized water, 0.4 part of potassium carbonate and 0.07 part of ammonium persulfate were introduced, and dissolved air was removed by deaeration under cooling, whereupon 52.2 parts of chlorotrifluoroethylene (CTFE) was introduced, and a reaction was carried out at 50° C. for 24 hours. After purging, an aqueous dispersion of a fluorocopolymer having a solid content of 50.6 mass was obtained.

Examples 14 and 15 and Comparative ExampleS 7 and 8

The coating material was blended as shown in Table 4, and it was applied on an aluminum plate by using a film applicator so that a dried coating film would have a thickness of 40 μm, followed by drying at 80° C. for 1 hour to obtain a test specimen. With respect to the test specimen, the evaluation of its gloss and weather resistance was carried out. The results are shown in Table 4. In the evaluation of the weather resistance, x indicates one wherein its gloss is significantly deteriorated after 1,000 hours of QUV test, and ○ indicates one wherein no substantial deterioration is observed in its gloss.

Here, the evaluation of the gloss and weather resistance was carried out by a handy gloss meter PG-1M manufactured by Nippon Denshoku Industries, Co., Ltd.

The names of the respective additives in Table 4 are the same as in Table 3 except for ones shown below. Further, the numerical values in Table 4 are parts by mass unless otherwise specified.

BASONAT HW100: A water-dispersible isocyanate, manufactured by BASF.

TABLE 4

|  | Ex. 14 | Ex. 15 | Comp. Ex. 7 | Comp. Ex. 8 |
|---|---|---|---|---|
| Synthesis Example 11 | 50 | 50 | 50 | 50 |
| Synthesis Example 1 | 60 | 60 |  |  |
| Synthesis Example 12 | 40.0 |  | 100.0 |  |
| Synthesis Example 13 |  | 40.0 |  | 100.0 |
| DEA | 7.0 | 7.0 | 7.0 | 7.0 |
| BASONAT HW100 | 10.0 | 10.0 | 10.0 | 10.0 |
| BYK 348 | 0.5 | 0.5 | 0.5 | 0.5 |
| BYK 080 | 1.0 | 1.0 | 1.0 | 1.0 |
| SANOL LS765 | 0.5 | 0.5 | 0.5 | 0.5 |
| TINUVIN 1130 | 3 | 3 | 3 | 3 |
| 60° gloss | 86 | 82 | 82 | 77 |
| Weather resistance | ○ | ○ | X | ○ |

INDUSTRIAL APPLICABILITY

The aqueous coating composition of the present invention has a low content of an organic solvent, whereby a burden on an environment is small. Further, an increase of the molecular weight and gelation of the polymer are suppressed, and the dispersion stability is excellent, whereby the composition is suited for providing a coating film which is excellent in storage stability and which has good water permeability/water resistance. Therefore, it is industrially very useful. Further, by using the composition, it is possible to provide a two-pack curable aqueous coating material kit which exhibits the above performances and which is easily handled.

The entire disclosure of Japanese Patent Application No. 2006-257053 filed on Sep. 22, 2006 including specification, claims and summary is incorporated herein by reference in its entirety.

What is claimed is:

1. A process for producing an aqueous coating composition comprising a dispersion of a fluorocopolymer (A), which fluorocopolymer (A) comprises the following units (1) to (4), wherein a proportion of the repeating unit (4) is from 1.4 mol % to 3.9 mol % based on the total repeating units, and an aqueous medium, wherein an amount of an organic solvent contained in the composition is from 0 to 1 mass %:

Unit (1): a repeating unit of a fluoroolefin,
Unit (2): a repeating unit of a vinyl monomer or an allyl monomer, and neither a hydroxyl group nor a carboxyl group which may form a salt, is bonded to the unit,
Unit (3): a repeating unit of a vinyl monomer having a hydroxyl group bonded thereto or of an allyl monomer having a hydroxyl group bonded thereto, and a carboxyl group which may form a salt, is not bonded to the unit, and
Unit (4): a repeating unit of a vinyl monomer or an allyl monomer, which is also a repeating unit to which a carboxylate group in which a part may be a carboxyl group, is bonded, the process comprising carrying out sequentially:
(a) a step of a copolymerization reaction by a solution polymerization method in an organic solvent to obtain a fluorocopolymer (B) containing the unit (1), the unit (2), the unit (3) and a polymerized unit (4-3) derived from a monomer having a carboxyl group bonded thereto;
(b) neutralizing a part or whole of the carboxyl group in the fluorocopolymer (B) by adding a basic compound, thereby forming fluorocopolymer (A);
(c) adding water; and
(d) removing the organic solvent.

2. The process for producing the aqueous coating composition according to claim 1, wherein the unit (1) is a unit represented by the following formula (a1), the unit (2) is a unit represented by the following formula (a2), the unit (3) is a unit represented by the following formula (a3), and the unit (4-3) is a unit represented by the following formula (a4-3):

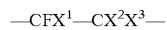

wherein in the formula (a1), each of $X^1$ and $X^2$ is independently a hydrogen atom, a chlorine atom or a fluorine atom, $X^3$ is a chlorine atom, a fluorine atom or $-CY^1Y^2Y^3$ (wherein each of $Y^1$, $Y^2$ and $Y^3$ is independently a hydrogen atom, a chlorine atom or a fluorine atom;

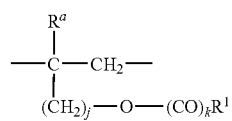

wherein in the formula (a2), $R^a$ is a hydrogen atom or a methyl group, $R^1$ is a $C_{1-12}$alkyl group or a $C_{4-10}$ monovalent alicyclic hydrocarbon group, j is 0 or 1, and k is 0 or 1;

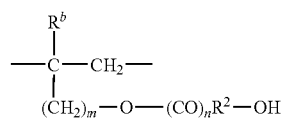

wherein in the formula (a3), $R^b$ is a hydrogen atom or a methyl group, $R^2$ is a $C_{1-10}$alkylene group or a $C_{4-10}$ divalent alicyclic hydrocarbon group, m is 0 or 1, and n is 0 or 1;

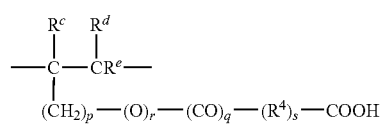

wherein in the formula (a4-3), $R^c$ is a hydrogen atom or a methyl group, $R^d$ is a hydrogen atom or a methyl group, $R^e$ is a hydrogen atom or —COOH, p is 0 or 1, r is 0 or 1, q is 0 or 1, $R^4$ is a $C_{1-15}$ alkylenegroup or a $C_{4-10}$ divalent alicyclic hydrocarbon group, and s is 0 or 1.

3. The process for producing the aqueous coating composition according to claim 2, wherein a part or whole of the fluorocopolymer (A) is dispersed in the composition.

4. The process for producing the aqueous coating composition according to claim 1, wherein the fluorocopolymer (B) contains from 40 to 60 mol % of the unit (1), from 3 to 50 mol % of the unit (2), from 4 to 30 mol % of the unit (3), from 1.4 to 3.9 mol % of the unit (4-3), and from 0 to 20 mol % of the unit (5) other than the units (1), (2), (3) and (4-3).

5. The process for producing the aqueous coating composition according to claim 4, wherein a part or whole of the fluorocopolymer (A) is dispersed in the composition.

6. The process for producing the aqueous coating composition according to claim 1, wherein said neutralizing (b) and said adding water (c), are carried out as (e) adding the basic compound as an aqueous solution, or said neutralizing (b) is carried out as (f) using an aqueous solution of the basic compound.

7. The process for producing the aqueous coating composition according to claim 6, wherein a part or whole of the fluorocopolymer (A) is dispersed in the composition.

8. The process for producing the aqueous coating composition according to claim 1, wherein the proportion of the carboxylate group is at least 60 mol % based on the total amount of the carboxyl group and the carboxylate group which are present in the fluorocopolymer (A).

9. The process for producing the aqueous coating composition according to claim 8, wherein a part or whole of the fluorocopolymer (A) is dispersed in the composition.

10. The process for producing the aqueous coating composition according to claim 1, wherein the carboxylate group is a quaternary ammonium salt group of a carboxyl group.

11. The process for producing the aqueous coating composition according to claim 10, wherein a part or whole of the fluorocopolymer (A) is dispersed m the composition.

12. The process for producing the aqueous coating composition according to claim 1, wherein the aqueous medium comprises only water, or water and an organic solvent, and the amount of the organic solvent is from 0 to 0.5 mass % in the composition.

13. The process for producing the aqueous coating composition according to claim 12, wherein a part or whole of the fluorocopolymer (A) is dispersed in the composition 14. The process for producing the aqueous coating composition according to claim 1, wherein a part or whole of the fluorocopolymer (A) is dispersed in the composition.

15. The process for producing the aqueous coating composition according to claim 1, wherein the proportion of the repeating unit (4) is from 2.0 mol % to 3.9 mol % based on the total repeating units.

* * * * *